US008438274B2

(12) United States Patent
Syed et al.

(10) Patent No.: US 8,438,274 B2
(45) Date of Patent: *May 7, 2013

(54) PROFILING OF COMPOSITE PHYSICAL DEVICES FOR MONITORING/CONTROL SYSTEMS

(75) Inventors: Rafee Syed, Brentwood, TN (US); Theresa K. Wall, Murfreesboro, TN (US); Jayme McQuillan, Murfreesboro, TN (US); Coni Wimsatt, Smyrna, TN (US); Christophe Francois, Villard Bonnot (FR)

(73) Assignee: Schneider Electric USA, Inc., Palatine, IL (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/894,532

(22) Filed: Sep. 30, 2010

(65) Prior Publication Data

US 2012/0084431 A1 Apr. 5, 2012

(51) Int. Cl.
*G06F 15/173* (2006.01)
*G06F 3/00* (2006.01)

(52) U.S. Cl.
USPC .......... 709/224; 709/223; 709/225; 709/226; 709/229; 710/9; 710/15

(58) Field of Classification Search .................. 709/224, 709/229, 227, 223
See application file for complete search history.

(56) References Cited

U.S. PATENT DOCUMENTS

| | | | |
|---|---|---|---|
| 5,966,532 A * | 10/1999 | McDonald et al. | 717/105 |
| 6,556,875 B1 * | 4/2003 | Nagasaka et al. | 700/19 |
| 6,751,562 B1 * | 6/2004 | Blackett et al. | 702/61 |
| 6,853,978 B2 * | 2/2005 | Forth et al. | 705/26.5 |
| 6,944,555 B2 * | 9/2005 | Blackett et al. | 702/62 |
| 6,990,395 B2 * | 1/2006 | Ransom et al. | 700/295 |
| 7,127,328 B2 * | 10/2006 | Ransom | 700/286 |
| 7,216,043 B2 * | 5/2007 | Ransom et al. | 702/62 |
| 7,272,457 B2 * | 9/2007 | Glanzer et al. | 700/83 |
| 7,734,380 B2 * | 6/2010 | Ransom et al. | 700/286 |
| 7,761,910 B2 * | 7/2010 | Ransom et al. | 726/6 |
| 8,024,492 B2 * | 9/2011 | Syed et al. | 710/9 |
| 2005/0143941 A1 * | 6/2005 | Forth et al. | 702/61 |
| 2007/0096942 A1 * | 5/2007 | Kagan et al. | 340/870.02 |
| 2007/0199061 A1 * | 8/2007 | Byres et al. | 726/11 |
| 2007/0250549 A1 * | 10/2007 | Meyer et al. | 707/203 |
| 2010/0161835 A1 * | 6/2010 | Syed et al. | 710/8 |
| 2012/0084431 A1 * | 4/2012 | Syed et al. | 709/224 |

OTHER PUBLICATIONS

Written Opinion corresponding to co-pending International Patent Application Serial No. PCT/US2011/053987, European Patent Office, dated Dec. 14, 2011; (8 pages).
International Search Report corresponding to co-pending International Patent Application Serial No. PCT/US2011/053987, European Patent Office, dated Dec. 14, 2011; (5 pages).
Gamma E. et. al. "Design Patterns: Elements of Reusable Object-Oriented Software, Passage"; Dated Sep. 1, 1999; (48 pages).

* cited by examiner

*Primary Examiner* — Backhean Tiv
(74) *Attorney, Agent, or Firm* — Nixon Peabody LLP

(57) ABSTRACT

A system and methods for creating a logical profile for physical devices in a system to interface with a monitoring system is disclosed. A profile identity is selected. A plurality of physical devices from the system is selected. The physical devices such as a meter or a circuit breaker include an output or an input. An input or output is classified for at least one of the plurality of selected physical devices as a tag. The plurality of selected physical devices are represented to the monitoring system by the profile identity and the at least one tag of the selected physical devices.

19 Claims, 4 Drawing Sheets

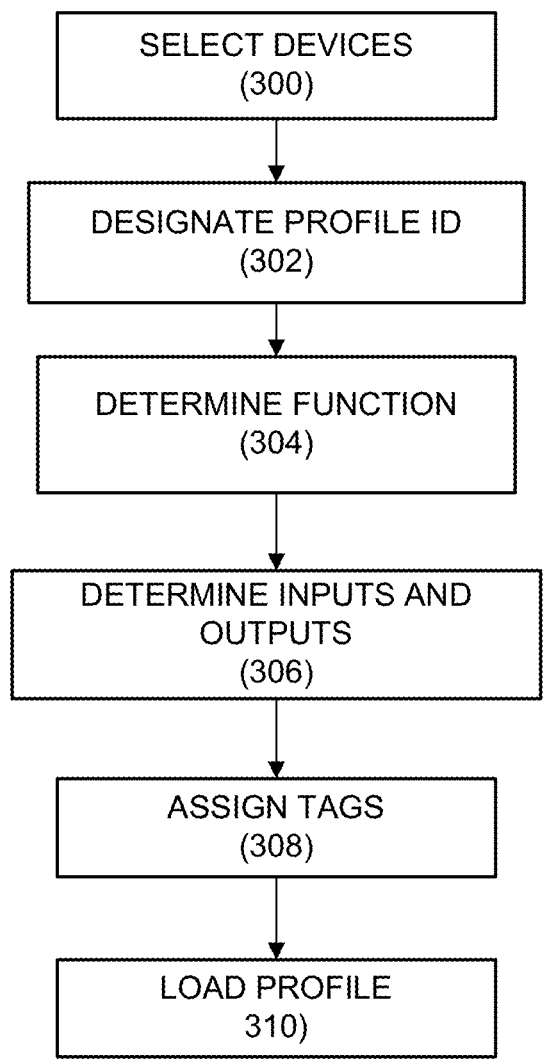

PROFILING OF COMPOSITE PHYSICAL DEVICES FOR MONITORING/CONTROL SYSTEMS

TECHNICAL FIELD

Aspects disclosed herein relate generally to control and monitoring systems and more specifically to creating profiles representing physical composite devices for such control and monitoring systems.

BACKGROUND

Modern power systems often include a variety of devices such as circuit breakers, switches, relays, etc. which require an array of controls to operate. Such systems typically also have a monitoring system that includes meters and often intelligent electronic devices (IEDs). IEDs may be configured to perform metering functions but also may provide a greater variety of data and have greater utility due to the ability to configure such devices to perform numerous functions. The power systems often contain hundreds of devices that are controlled and monitored. Thus, the monitoring systems may also have dozens or hundreds of IEDs and meters that monitor various points in the power system. The monitoring and power systems may have a central controller that receives data from the IEDs. The central controller may double as a control system. Such systems are referred to as Supervisory Control and Data Acquisition (SCADA) systems. An example of such a system is the PowerLogic SCADA system available from Schneider Electric. Such systems require input and output interfaces with devices in the power system for control signals or for data acquisition from metering devices.

Traditionally, a SCADA system requires separated physical devices in a system with separate inputs and outputs to the central controller. When there are numerous control devices and monitoring devices, it is difficult to identify the specific monitoring device in the system when urgent data or messages are received by the central controller. Further with numerous control devices in the system, it is difficult to determine specific control units since many of the control devices are similar or identical. For example, if a switchgear panel has multiple IEDs and an alarm is received, a user of the SCADA system cannot easily find out which specific IED the alarm is received from. It requires substantial resources and time to make separate physical devices look like one device in a SCADA system to facilitate rapid identification of a particular device for data and control functions.

Therefore there is a need for an interface with physical devices by a control and monitoring system that allows a user to identify a particular device in a system. There is a further need for a system that allows rapid profiling of a device or devices as they are added to a SCADA system.

BRIEF SUMMARY

According to one example, a method of creating a logical profile for physical devices in a system to interface with a monitoring system is disclosed. A profile identity is selected. A plurality of physical devices from the system is selected. The physical devices include an output or an input. An input or output for at least one of the plurality of selected physical devices is defined as a tag. The plurality of selected physical devices are represented to the monitoring system by the profile identity and the at least one tag of the selected physical devices.

Another example is a monitoring system including a plurality of physical devices having inputs or outputs. A master controller is coupled to the plurality of physical devices. A monitoring system is installed on the master controller. The monitoring system interfaces with the plurality of devices via a logical profile representing a selected number of physical devices from the plurality of physical devices. The logical profile includes at least one tag defining an input or output for one of the selected physical devices.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 3 is a flow diagram of the creation of a logical profile for physical devices in a monitoring and control system.

Figure 1:
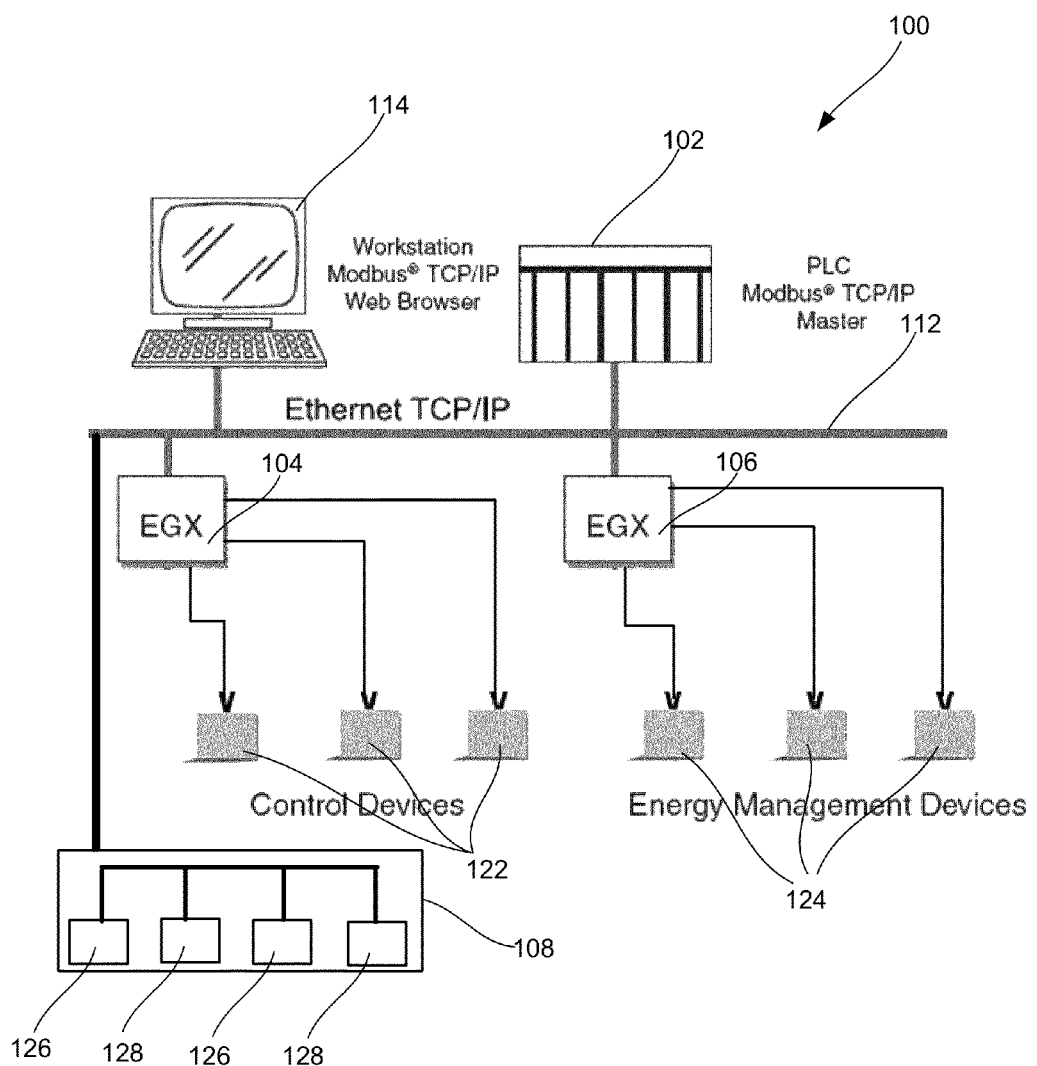
FIG. 1 is a diagram of a power monitoring and control system having monitoring and control devices that are controlled by a master controller.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 shows a utility data monitoring and control system 100 that includes a master controller 102 coupled to a controller 104, controller 106 and a panel 108 via a network 112. As will be explained the utility data monitoring and control system 100 generates data based on monitoring various devices in a utility system and allows the control of various devices. In this example, the controller 104 is coupled to slave control devices 122 such as transformer temperature controllers, relays or trip units for controlling electrical equipment. In this example, the controller 106 is coupled to slave monitoring devices 124 such as power meters and circuit monitors. The panel 108 includes both control devices 126 and monitoring devices 128. A programmable logic controller (PLC) may be used for the controllers 104 and 106. A PLC or microprocessor-based intelligent electronic device (IED) may also be used for the slave devices 122, 124, 126 and 128. In this example, each of the slave devices 122, 124, 126 and 128 has an identification address according to the Modbus serial communications protocol, a well known standard protocol in the industrial automation, monitoring, and control systems fields. It is to be understood that fewer or additional slave devices may be used with the system 100. Further, the master controller 102 may control additional controllers that in turn communicate with additional slave devices. Further, additional master controllers like the master controller 102 may be coupled to the network 112 to provide separate monitoring and control functions.

The master controller 102 periodically communicates with the controllers 104, 106 and the devices coupled to the panel 108 and therefore the devices 122, 124, 126 and 128 using composite device profiles as will be described below to receive and send data and control signals. The controllers 104 and 106 and panel 108 and their respective slave devices 122, 124, 126 and 128 are viewed as composite devices by the master controller 102 to efficiently organize such devices in the system 100.

In this example, the network 112 is a local area network (LAN). Of course other network topologies such as a token ring or serial loop may be used. The network 112 may include the Internet, wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

The network 112 may further employ a plurality of wireless access technologies including, but not limited to, second (2G), third (3G) generation radio access for cellular systems, Wireless-LAN, Wireless Router (WR) mesh, and the like. Access technologies such as 2G, 3G, and future access networks may enable wide area coverage for mobile devices with various degrees of mobility. For example, the network 112 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices may be remotely connected to either LANs or WANs via a modem and temporary telephone link. In essence, the network 112 includes any communication method by which information may travel between devices such as controllers 102, 104 and 106 and the like.

Additionally, the network 112 may include communication media that typically embodies computer-readable instructions, data structures, program modules, or other data in a modulated data signal such as a carrier wave, data signal, or other transport mechanism and includes any information delivery media. The terms "modulated data signal" and "carrier-wave signal" include a signal that has one or more of its characteristics set or changed in such a manner as to encode information, instructions, data, and the like, in the signal. By way of example, communication media may include wired media such as, but not limited to, twisted pair, coaxial cable, fiber optics, wave guides, and other wired media and wireless media such as, but not limited to, acoustic, RF, infrared, and other wireless media.

A computer or workstation 114 is also coupled to the network 112. As will be explained the computer 114 allows examination of collected data. The computer 114 communicates with the master controller 102 and may include a memory with a database to store the categories of time-value data pairs which are collected by the devices 124 and 128. The computer 114 may include applications such as software that analyzes the data or monitoring software. The computer 114 also allows a user to configure and add composite profiles for use by the master controller 102 for devices in the system 100.

The utility being monitored and controlled by the system 100 can be any of the five utilities designated by the acronym, WAGES, or water, air, gas, electricity, or steam in this example. Each monitoring device represented by the devices 124 and 128 measures characteristics of a utility device or devices, and quantifies these characteristics into data categories that can be further analyzed by software. In this example, the data is output by the devices 124 and 128 in a format understood by one of the controllers 106 or 102. For example, the devices 124 and 128 may measure categories of data in time-value pairs such as power, energy, volume per minute, volume, temperature, pressure, flow rate, or other characteristics of water, air, gas, electricity, or steam utilities and then output data relating to such measurements and the related time of the measurements. In the electrical context, the devices 124 and 128 may be a PowerLogic® Series 3000/4000 Circuit Monitor or a PowerLogic® ION7550/7650 Power and Energy Meter available from Schneider Electric or any other suitable monitoring device such as an intelligent electronic device (IED), a metering device, or a power meter.

The master controller 102 in this example is a dedicated programmable logic controller that transmits and receives Modbus communications from the network 112 via a TCP/IP interface. The master controller 102 includes a Supervisory Control and Data Acquisition (SCADA) system that both monitors data received from meters and monitors and sends control signals to operate devices. Although a SCADA system is described herein as an example, any system that communicates with physical devices may use the logical profiles described below for more efficient control and monitoring of physical devices. In this example, each of the physical devices 122, 124, 126 and 128 in combination with the respective controllers 104 and 106 or panel 108 are seen as profiled logical objects that the SCADA system may readily identify regardless of the actual physical device. The master controller 102 allows a user to perform monitoring and control functions via any device in the system 100 via different applications that communicate with the controllers 104 and 106 using the logical profiles of such devices. In this example, the master controller 102 is run with a PowerLogic SCADA system available from Schneider Electric. The SCADA controller receives data in the form defined by the logical profiles representing the controllers 104 and 106 and panel 108 in combination with their slave devices 122, 124, 126 and 128 rather than direct connection to the multiple devices.

The logical profiles are thus objects that are understood by the SCADA system on the master controller 102 but may represent any physical device or devices that fit the logical profile by performing a function or functions defined by the logical profile. The system 100 in FIG. 1 therefore would be represented by logical profiles for three composite devices composed of one of the controllers 104 and 106 or panel 108 and their respective slave devices 122, 124, 126 and 128. The logical profiles are thus objects that represent an actual physical group of devices with physical outputs and inputs to the SCADA system on the master controller 102. A logical profile may represent multiple actual physical devices grouped as a composite device as one logical device. Alternatively, a logical profile may represent a single device such as a controller which is a data concentrator that controls multiple physical devices and therefore is seen as multiple logical devices to the SCADA system.

A profile editor that may be accessed on the computer 114 allows creation of logical profiles which may be used to represent composite physical devices such as the controllers and devices in FIG. 1 or panels and components to manage data and control for other devices. The creation of the logical block profiles allows different devices to be described in a common format to the SCADA system. The logical profiles include tags which provide context to inputs and outputs of the composite physical devices. The block profiles also may use functional blocks which are premised on the fact that many different devices have areas/memory that are repetitive in nature and therefore have similar measurement data despite having different hardware. These devices have the same blocks of functionality but are differentiated only by their addressing. For example, an input/output board such as the panel 108 and its respective devices 126 and 128 are a example of this capability. The input/output boards may have the same functionality but the data may be addressed differently based on a variety of different devices on the boards. A user may encapsulate the "like" functionality of a device as a group of tags or measurement values in a functional block object representing the device. Once the functionality has been grouped together, it is then necessary to allow the user to define the tag addressing so that it can be used to represent "other" blocks of the same functionality.

As shown in Table 1, below, there is a repetitive "block" of functionality that may be seen (Analog ValueX, Scale AVx, Units AVx) among the different devices which all output the same type of analog value, in the same scale and in the same measurement unit. This group of similar tags may therefore be used to form a functional block. Once the functional block has been formed, it is necessary to define the repetitive addressing scheme (in this example a starting address+offset) that has been used by the device.

Once a functional block has been created, the user may add it to a logical profile and define a different starting address depending on which input/outputs they are including in the profile. Table 1 below shows six input/output points that have different physical addresses. The tags that define (contextualize) ports I1-I3 to ports I4-I6 are identical and therefore a functional block may be created to define a repetitive addressing scheme to describe the input/output of the functional block representing the tag having an analog value, scale and units. Thus two functional blocks may be created as shown in TABLE 1.

TABLE 1

| IO point | Physical Address | Physical Device tag | Functional Block | Functional Block addressing |
|---|---|---|---|---|
| I1 | 1000 | Analog Value 1 | Analog Value | Starting Address + 0 |
| I2 | 1001 | Scale AV1 | Scale | Starting Address + 1 |
| I3 | 1002 | Units AV1 | Units | Starting Address + 2 |
| I4 | 1003 | Analog Value 2 | Analog Value | Starting Address + 0 |
| I5 | 1004 | Scale AV2 | Scale | Starting Address + 1 |
| I6 | 1005 | Units AV2 | Units | Starting Address + 2 |

In Table 1, the IO points and physical addresses are the inputs and outputs of the physical devices that make up the composite device. The physical device tag defines the various inputs and outputs. The functional block addressing is based on a starting address which is the address of the analog value for a particular input block.

In this example, a functional block is made up of tags from the same device type. Tags in the functional blocks may include: a) real time measurements; b) resets; and c) control signals. The tags may therefore apply to both monitoring of data measurements and control signals which are managed by the SCADA system on the master controller 102. When a functional block is created the user can specify the address of any tag in mathematical terms, parameters and offsets (defining the repetitive addressing) as shown in Table 1. When a functional block is added to a logical profile the user may change/override addressing for any tag within a functional block and change/override the tag name for any tag within a functional block (giving a generic point meaning specific to a particular system).

Each physical device is assigned a logical device profile for programming by the SCADA system in the master controller 102. In this example, the logical device profile represents a composite device made up of a plurality of physical devices (embedded devices). Each physical device may be a different device type (embedded device types) as long as the embedded devices perform the functions and input or outputs as defined by the logical device profiles.

The logical device profile is created by a profile editor for each type of physical device or composite physical device. Each logical device profile includes a plurality of different physical device profiles for each of the embedded devices on the composite device. Each embedded device profile may include tags of different types that contextualize or define different inputs and outputs of the physical device. In this example, the tags may include real time tags, alarm tags, trend tags, onboard alarms, resets and controls. Examples of real time tags include apparent energy, current phase, physical device health, breaker tripped, and lights on. Examples of alarm tags may include an over current phase, a protection 66 (number of motor starts exceeded), and under frequency. Examples of trend tags include apparent energy logged at 15 minute intervals and demand current phases logged at 15 min intervals. The generic inputs for a device which may include either analog or digital inputs are mapped to the logical profile. For example a digital input1 could be designated as "MeetingRoom.Physical Health PLC." An analog input1 could be designated as "MeetingRoom.Current Phase A." A digital input2 could be designated as "MeetingRoom.Breaker Tripped." A digital input3 could be designated as "MeetingRoom.Lights On." Thus, the tags thus represent input and output data and signals to the composite device. Each tag in a logical profile must be unique. If more than one embedded device profile has the same tag defined, only one of those tags will be included in the overall logical profile of the composite device.

The profile editor allows a user to combine different physical device profiles in order to "create" a composite device profile for composite physical devices. The composite profile then can be used by the profile wizard to serve as a base for creating additional profiles of other composite devices. When the user is adding a device to the system such as the system 100 that is of "composite type," the profile editor will ask the user to choose from a list of physical devices that are of the proper type. This composite device type will keep "track" of the kinds of device profiles that are needed to create it, and this information will be used to prompt the user for the appropriate physical device when the composite device is being added to the SCADA system on the master controller 102.

For example, the physical devices that may be embedded in a composite device may include circuit breakers and meters, each having associated tags. For a composite device such as a panel, a user could create a logical profile and would then be prompted to pick a physical device such as a Sepam circuit breaker, and a second physical device such as a PM 850 type meter. Once these devices are specified, the tags are automatically created linking the identity of the Sepam circuit breaker to "PhyDev1" and the identity of the PM 850 meter to "PhyDev2" in the profile tag definitions for the composite device (LogicalDevice1). The inputs or outputs (specific to the embedded device) and the respective values are also linked to the tags. The tags are therefore linked to the actual output of the physical device such as inputs from the circuit breaker or output ports from the meter. Thus, a user of the SCADA system on the master controller 102 will have control over a logical device with breaker status and trip state as well as the current data from the meter, but will not have to have knowledge of the actual physical devices that produce such data or require such signals. Such a logical profile with five tags indicating inputs and outputs for two physical devices is shown in TABLE 2 below.

TABLE 2

| User Sees | Logical Name/ Functionality | Linked to Physical device |
| --- | --- | --- |
| LogicalDevice1.Device Closed | LogicalDevice1\ XCBR1\Pos | PhyDev1\I1 |
| LogicalDevice1.Breaker Tripped status | LogicalDevice1\ PTRC1\Op | PhyDev1\I2 |
| LogicalDevice1.Current A | LogicalDevice1\ MMXU1.A.Pha | PhyDev2\ MMXU1.A.Pha |
| LogicalDevice1.Current B | LogicalDevice1\ MMXU1.A.Phb | PhyDev2\ MMXU1.A.Phb |
| LogicalDevice1.Current C | LogicalDevice1\ MMXU1.A.Phc | PhyDev2\ MMXU1.A.Phc |

Other physical devices with processing capabilities or the ability to be configured such as a programmable logic controller or an IED may have tags that represent outputs of processed or calculated data taken from the device or slave devices coupled to the PLC or IED. As explained above, a logical profile may thus represent a composite device having a controller coupled to multiple physical devices but with a single output calculated by the controller from the inputs from the multiple devices. In this instance, the master controller 102 would view the multiple physical devices of the composite device as a single device based on the logical profile.

Figure 2A:
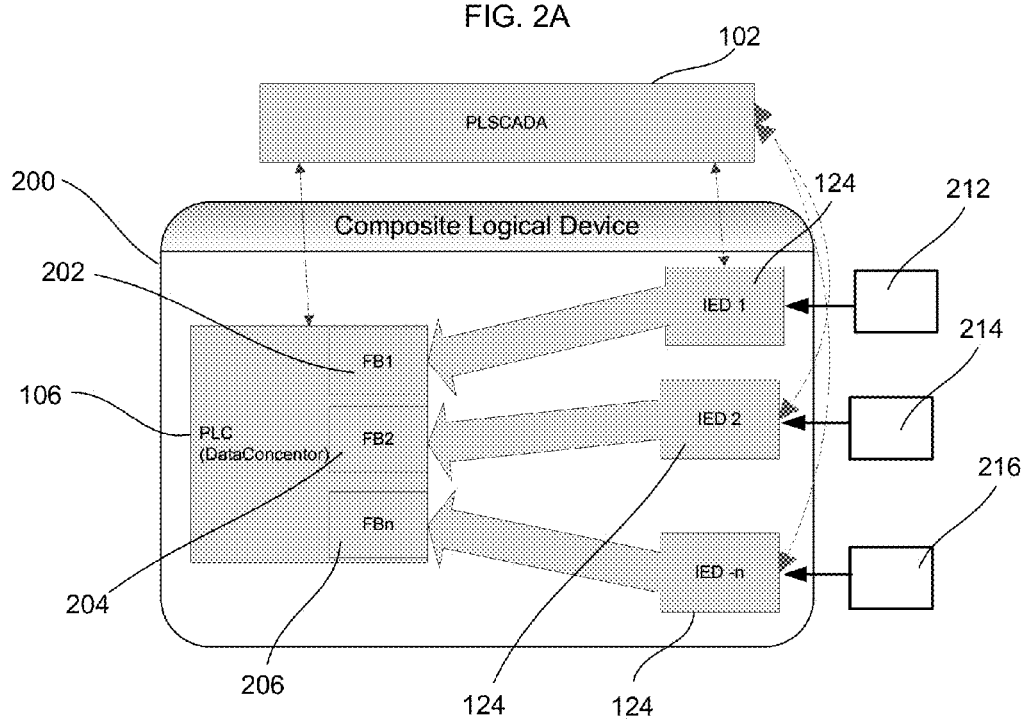
FIG. 2A is a diagram of one set of the physical devices in FIG. 1 forming a logical device profile for the master controller.

FIG. 2A is a block diagram showing a logical profile 200 that represents a composite physical device that includes the controller 106 and slave monitoring devices 124 in FIG. 1. The logical profile 200 is viewed as an object which is created to represent the controller 106 and the slave monitoring devices 124 for the SCADA system on the master controller 102 in FIG. 1. The logical profile 200 allows the SCADA system to communicate with the physical devices such as the monitoring devices 124 without having to account for each physical device individually since the devices are viewed as an object. The composite physical device includes the programmable logic controller (PLC) 106. The PLC 106 is represented by a series of functional blocks 202, 204 and 206 which are defined by the profile editor as part of the logical profile of the composite physical device. The functional blocks 202, 204 and 206 include tags that define (contextualize) the inputs and outputs of devices that are part of the physical composite device such as intelligent electronic devices 124 in FIG. 1 serving as monitoring devices. Each of the IEDs 124 are coupled to respective circuit breakers 212, 214 and 216 to monitor the status and trip state of each of the circuit breakers 212, 214 and 216. The actual type of physical device that performs the monitoring is not required by the SCADA system and therefore other monitors having the same inputs and outputs defined by tags could be used to monitor the circuit breakers 212, 214 and 216 and use the same logical profile. In this example, the PLC 106 has six input/output ports and each of the ports is defined as the status and trip state of the circuit breakers 212, 214 and 216 and each functional block 202, 204 and 206 therefore has tags for the status and trip state for the circuit breakers 212, 214 and 216. The status and state of each circuit breaker 212, 214 and 216 is read from the appropriate PLC input/output point which is defined by the functional blocks 202, 204 and 206. All of the physical devices including the PLC 106 and the IEDs 124 are considered as a single object profile by the SCADA system on the master controller 102. The source of the status and trip state of the circuit breakers 212, 214 and 216 therefore is readily available via the tags of the logical profile 200.

Figure 2B:
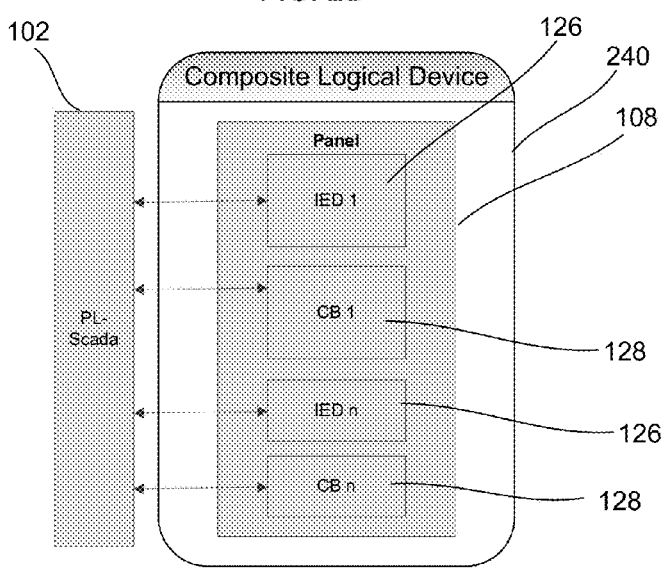
FIG. 2B is a diagram of another set of the physical devices in FIG. 1 forming a logical device profile for the master controller.

FIG. 2B shows another logical profile 240 that represents a composite physical device including the electrical panel 108 and the control devices 126 and the monitoring devices 128 in FIG. 1. In this example, the panel 108 includes the monitoring devices 128 which are intelligent electronic devices (IED) configured for metering and a series of control devices 126 such as circuit breakers. The panel 108 is representative of multiple panels in a system such as the system 100 in FIG. 1, except that the loads monitored by the IEDs on each panel are different. Therefore each panel contains many different physical devices such as meters 128 and circuit breakers 126. A logical profile representing each panel such as the panel 108 may therefore reference the panel itself and the tags that relate to the individual physical devices on the panel 108 rather than each separate physical device. In this example, the tags for the circuit breaker 126 on the panel 108 includes outputs for the trip status and the breaker status and appropriate offset addresses, while the tags for the meters 128 includes the outputs for the current values and voltage values measured by the meter.

Figure 2C:
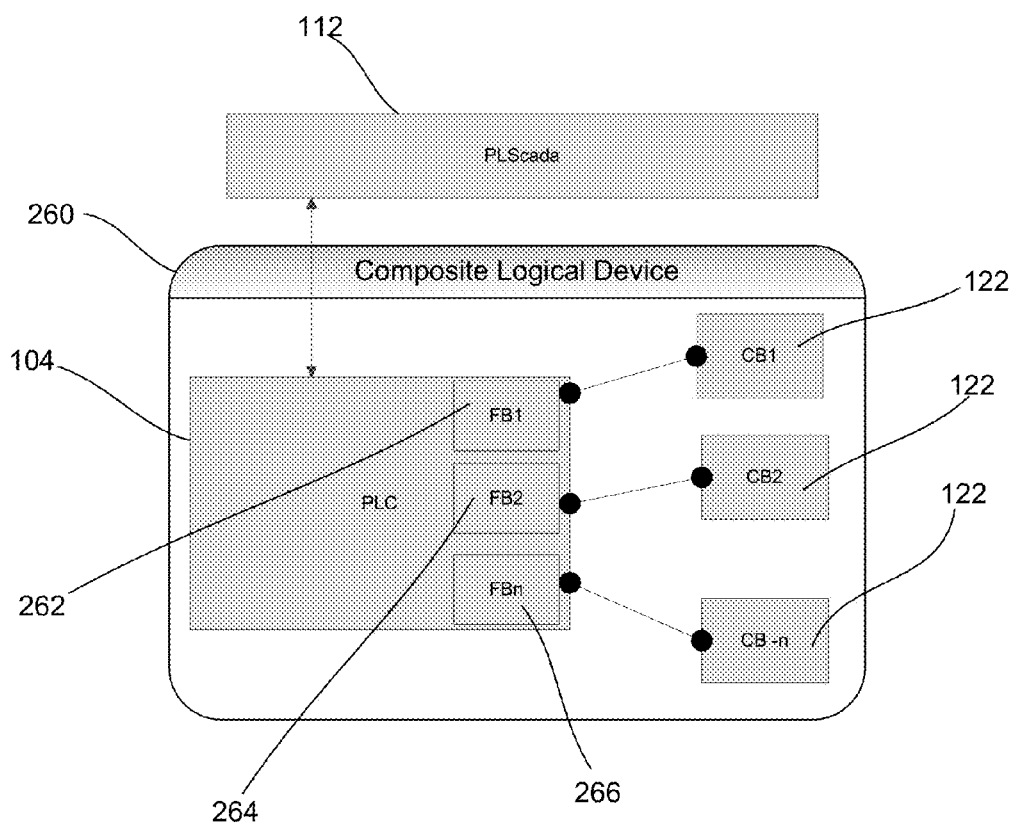
FIG. 2C is a diagram of another set of the physical devices in FIG. 1 forming a logical device profile for the master controller.

FIG. 2C shows another logical profile 260 that represents a composite physical device including the controller 104 and the control devices 128 in FIG. 1. The controller 104 is defined with a series of functional blocks 262, 264 and 266 which are defined by the profile editor as part of the profile of the composite physical device. The functional blocks 262, 264 and 266 define tags that represent the input/output to control devices such as the circuit breakers 122. The controller 104 monitors the status and trip state of each of the circuit breakers 122. In this example, the controller 104 has six input/output ports and each of the ports is defined as the status and trip state of the circuit breakers 122 and each functional block 262, 264 and 266 therefore has tags for the status and trip state for the circuit breakers 122. The status and state of each circuit breaker 122 is read from the appropriate PLC input/output point which is defined by the functional blocks 262, 264 and 266. All of the physical devices including the controller 102 and the circuit breakers 122 are considered as a single object profile by the SCADA system on the master controller 102. In this example, an additional output of the controller 104 could be assigned a tag to reference all physical devices, so every physical device would reference this tag to show if the controller 104 is offline. In this case, the master controller 102 would see the multiple physical devices 122 as a single logical device.

Certain devices are available to monitor the same values from multiple sites/loads. This composite device type is very similar to an input/output card that may be added to a controller except for the fact that these input/output points are static as the addressing and the formatting of the data doesn't change. In this case certain devices monitor many different loads, but also have values that apply to all of the loads. These devices are typically monitoring the current at the branch level in a system, but are assuming the same voltage levels (so the device stores one voltage value and all the loads use the voltage value. In this case, the tag would include a common address for the value. Thus, a control device may have several switches but each switch uses the same local/remote control. Alternatively, a multi-channel meter may use different channels to measure current, but each one uses the same voltage. Also, if a controller is used as a data concentrator, a common tag could be used for all of the physical devices controlled by the controller.

Any of these algorithms include machine readable instructions for execution by: (a) a processor, (b) a controller, and/or (c) any other suitable processing device. It will be readily understood that the system 100 includes such a suitable processing device. Any algorithm disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in a flowchart in FIG. 3 depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 3 shows a process of creating a logical profile of a composite physical device suitable for the SCADA system on the master controller 102 in FIG. 1. The creation of the logical profile is performed in this example by an application running on a workstation such as the computer 114. A user selects the physical devices from the system 100 that will be included in the logical profile (300). The identity of the logical profile is selected (302). The function or functions of the selected physical devices is determined (304). The appropriate input and outputs of the combined devices is determined for the determined function or functions (306). Tags are assigned to the appropriate input and outputs for the combined devices to define the inputs and outputs (308). The logical profile is loaded for the SCADA system (310).

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of creating a logical profile for physical devices in a power system to interface with a monitoring system, the method comprising:

selecting a profile identity to identify a logical profile representing a combination of physical devices in the power system, the profile identity including an address accessible to the monitoring system;

selecting a plurality of physical devices from the power system represented by the logical profile, the physical devices including an output or an input, and being identified with the profile identity;

defining a plurality of tags associated with the logical profile, each of the tags being associated with an input or output for at least one of the plurality of selected physical devices;

automatically assigning addresses accessible to the monitoring system to each tag based on the address of the profile identity; and wherein the plurality of selected physical devices are represented to the monitoring system by the logical profile including the profile identity and the plurality of tags of the selected physical devices and the automatically assigned addresses.

2. The method of claim 1, wherein a tag is assigned to any physical device type that has a defined input or output.

3. The method of claim 1, wherein the physical devices include power monitoring devices and power control devices.

4. The method of claim 1, wherein the selected plurality of physical devices include a controller and slave devices coupled to the controller.

5. The method of claim 1, wherein the logical profile is matched to additional devices on the system to represent the additional devices.

6. The method of claim 1, further comprising creating a functional block for the logical profile, the functional block including the plurality of tags, the functional block applied to all physical devices having inputs or outputs defined by the plurality of tags, the functional blocks defining an address offset an address offset for each tag represented by the function block to determine the address of the tags of the functional block.

7. The method of claim 1, wherein at least one tag includes real time data, an alarm signal or control signals.

8. The method of claim 1, wherein the plurality of selected physical devices includes a processing device calculating data received from another one of the plurality of selected physical devices and at least one tag defines the calculated data.

9. A monitoring system comprising:

a plurality of physical devices having inputs or outputs;

a master controller coupled to the plurality of physical devices; and a monitoring system on the master controller, the monitoring system interfacing with the plurality of devices via a logical profile representing a selected number of physical devices from the plurality of physical devices, the logical profile including an address accessible to the monitoring system, the logical profile including a plurality of tags each defining an input or output for one of the selected physical devices; wherein each tag has an automatically assigned address accessible to the monitoring system based on the address of the logical profile.

10. The system of claim 9, wherein a tag is assigned to any physical device type that has a defined input or output.

11. The system of claim 9, wherein the physical devices include power monitoring devices and power control devices.

12. The system of claim 9, wherein the selected plurality of physical devices includes a controller and slave devices coupled to the controller.

13. The system of claim 9, wherein the logical profile is matched to additional devices on the system to represent the additional devices.

14. The system of claim 9, wherein the logical profile includes a functional block including the plurality of tags, the functional block applied to all physical devices having inputs or outputs defined by the plurality of tags, the functional blocks defining an address offset for each tag represented by the function block to determine the address of the tags of the functional block.

15. The system of claim 9, wherein at least one tag includes real time data, an alarm signal or control signals.

16. The system of claim 9, further comprising a network coupled to the master controller and the plurality of physical devices.

17. The system of claim 9, wherein the plurality of selected physical devices includes a processing device calculating data received from another one of the plurality of selected physical devices and at least one tag defines the calculated data.

18. The method of claim 3, wherein the power monitoring devices include a meter and the power control devices include a circuit breaker.

19. The system of claim 11, wherein the power monitoring devices include a meter and the power control devices include a circuit breaker.

* * * * *